United States Patent Office 2,923,966
Patented Feb. 9, 1960

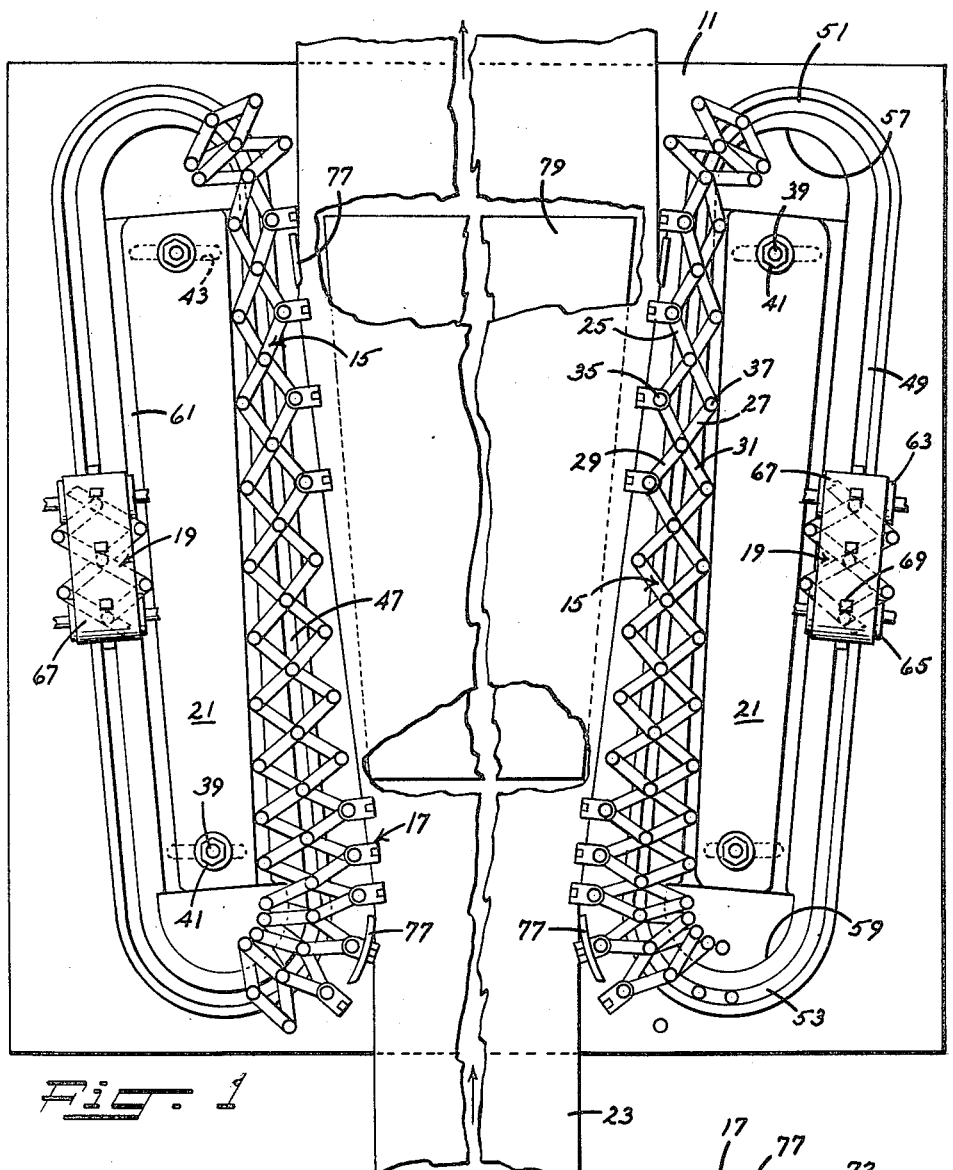

2,923,966

CONTINUOUS BIAXIAL STRETCHING DEVICE

William Raymond Tooke, Jr., Wilmington, Del., and Edmund G. Lodge, Jr., Upper Darby, Pa., assignors to American Viscose Corporation, Philadelphia, Pa., a corporation of Delaware Application December 24, 1957, Serial No. 704,992

5 Claims. (Cl. 18—1)

The present invention relates to the manufacture of plastic films, and particularly to apparatus for biaxially stretching films of polyethylene or like thermoplastics to improve the properties thereof.

In the manufacture of films of polyethylene or like thermoplastics, the most generally accepted practice is to force the melted polymer through a desirably shaped die, as for example, an annular or elongated slot, and then quench the continuous extruded tube or curtain of melt by either a liquid or gaseous cooling medium. At this stage, the film thus produced is reasonably strong but is without marked molecular orientation and tends to assume opaque or hazy optical characteristics. The physical properties of the film, however, can be vastly improved by stretching or drawing the film in both longitudinal and transverse directions. The stretching is normally conducted at elevated temperatures in the range of the crystalline melting point of the film (100–145° C.). During stretching, the essentially unoriented film acquires a condition of plane molecular orientation. This rearrangement in structure is accompanied by the development of greatly enhanced tensile strength and improved optical clarity. To insure that the improved properties, such as the tensile strength, are uniform in all directions of the film, the film should be stretched or drawn simultaneously in both longitudinal and transverse directions at the same draw ratio.

The prior art has recognized the merits of biaxially stretching a film so as to orient its molecular structure. There is, however, no teachings in these prior disclosures of apparatus for effecting a biaxial stretching of a film which is in the form of a continuous traveling flat web or sheet of material. Prior proposals of stretching a film first in one direction and then in another direction tends to impart non-uniform properties to the film. Similar results are obtained when the film is extruded as a tube which is expanded while being drawn in a longitudinal direction. Simultaneously stretching of individual sheets or sections of film in 90° biaxial directions may provide the desired results, but a procedure of this type is neither convenient nor economical in mass production techniques. Accordingly, the primary object of this invention is to provide an improved and more satisfactory apparatus for simultaneously stretching, in 90° biaxial directions, a continuous traveling flat film or web material.

Another object of the invention is to provide an apparatus for simultaneously stretching, in 90° biaxial directions and at any desired draw ratio, a continuous and advancing flat film or web material.

Still another object of the invention is the provision of an apparatus having means for gripping the opposite longitudinal edges of a continuous advancing film and uniformly drawing or stretching the same simultaneously in both longitudinal and transverse directions at a desired draw ratio.

A further object is the provision of means for simultaneously stretching a continuous traveling flat film simultaneously in 90° biaxial directions while the film is heated to an elevated temperature.

These and other objects, features, and advantages will become apparent from the following description of the invention and the drawing relating thereto in which:

Figure 1 is a plan view of the apparatus of the present invention, with portions thereof being broken away; and Figure 2 is a partial vertical transverse section of a portion of the structure shown in Figure 1.

In general, the apparatus of the present invention includes a pair of spaced endless conveyors having tenter clips which are designed to engage with the opposite longitudinal edges of a continuous advancing film. The endless conveyors are disposed along divergent planes so as to effect a transverse stretching of the film as the tenter clips, which are engaged therewith, travel from a first position to a second position, and are each formed of series of links pivoted to each other to provide a lazytong structure. Cam means serve to elongate the reaches of endless conveyors adjacent the continuous film to effect a longitudinal stretching thereof simultaneously with the transverse drawing. A heater is provided for elevating the temperature of the film during the stretching operation.

With reference to the drawing, the apparatus of the present invention includes a table or base member 11, a pair of endless conveyors 15 which carry film engaging tenter clips 17, drive means 19 for actuating the endless conveyors 15, and a pair of support plates 21 for guiding the conveyors 15 along their desired paths. It will be understood that the film stretching device here described is normally positioned between conventional film extrusion and take-up means, neither of which is illustrated, so that the freshly extruded and quenched film follows a generally straight line course over the central portion of the base member 11.

The endless conveyors 15 are disposed on opposite sides of the path of the film shown at 23, and are each formed of series of links pivotally interconnected to each other to provide an endless arrangement of parallelogrammatic structures which can be longitudinally expanded and retracted in much the same manner as a conventional lazytong device. The links 25, 27, 29 and 31 of each series are connected to each other by a pivot pin 33, while the links 25 and 27 are hinged by the pins 35 and 37, respectively, to the ends of links 29 and 31 of an adjacent series of links. As shown in Figure 2, the end portions of all the links are of reduced or half thickness so that each pair of interconnected links, such as 25 and 29 lie in the same plane. The support plates 21 are disposed below the endless conveyors 15 and rest on the base member 11 where they are fixed in position by screws 39 and bolts 41. The endless conveyors 15 and their respective support plates 21 are initially positioned on the base member 11 in diverging relationship so as to effect a transverse stretching or drawing of the film 23, as more fully described hereafter. However, elongated slots 43 are provided in the base member 11 to permit the overlying structures to be laterally adjusted so as to accommodate films of various widths.

The support plates 21 are of similar construction, each including an endless slot or channel 45 having substantially straight parallel portions 47 and 49 connected by arcuate end portions 51 and 53 of substantially the same radius. As best seen in Figure 2, the enlarged lower ends of the pivot pins 33 of each of the endless conveyors 15 are disposed within the slots 45 of the respective support plates 21, and are thus guided along the desired path. To effect expansion or elongation of the adjacent reaches of the opposing endless conveyors, the support plates 21 are each provided with a cam slot or track 55 which extends along a plane converging with the adjacent portion 47 of the guide slot 45. The enlarged lower ends of the pivot pins 37 are received within the cam slots 55 and are gradually urged toward each other concomitantly with their movement along the cam slots so as to transversely distort the parallelogrammatic link structures and effect an extension or elongation in the adjacent reaches of the opposing endless conveyors. The end portions of each of the cam slots 55 open into cut-out portions 57 and 59 in the support plates 21 which permit the parallelogrammatic link structures to retract or compress in response to the elongation occurring in the adjacent reaches of the opposing conveyors. Preferably, a second guide slot 61, extending parallel to the adjacent portion 49 of slot 45, is provided in each of the support members 21 to better control the conveyors as they pass beneath the driving means 19, the latter of which are supported from an adjustable overhead structure. The driving means 19 each include a pair of rolls 63 and 65 over which is trained an endless belt 67, with at least one of the rolls being driven by a suitable means, not shown. The belts 67 are each provided with downwardly projecting lugs 69 which are adapted to engage with the pivot pins 33 and urge the same along the guide slot 45.

The tenter clips 17 are of conventional construction and are supported at spaced intervals along the endless conveyors 15 by means of the pins 35. Each of these clips includes a fixed jaw 71 and a movable jaw 73, the latter of which is normally maintained in an opened position by a leaf spring 75. As the opposing jaws of the tenter clips move into position on opposite sides of the film, the movable jaws 73 ride along elongated cam plates 77 which sequentially urge the same toward their respective fixed jaws and grip the film therebetween. The cam plates are each supported by an overhead structure, not shown, and terminate at points adjacent to the ends of the cam slots 55, thus allowing the film 23 to continue its straight line course while the tenter clips 17 are disengaged from the film and commence their arcuate path along the guide slot portions 49.

Heating of the film during the stretching or drawing of the same is effected by a heater 79, supported by the base member 11 and fitted with suitable heating means, such as infra red lights or steam coils not shown.

In operation, the freshly extruded and quenched film 23 is initially advanced manually toward and between the endless conveyors 15 where its opposite longitudinal edges are gripped by the tenter clips 17. Once the driving means 19 are set in operation, the endless belts 67 urge the conveyors 15 to advance the film through the stretching apparatus and toward the take-up mechanism. The divergent relationship of the endless conveyors 15, will effect a lateral stretching of the film simultaneously with its advancing movement toward the take-up means. It will be understood that the adjacent reaches of the opposing endless conveyors 15 are inclined at substantially equal angles relative to the center line of the film 23 to insure that the transverse stretching of the film commences at its center portion and extends outwardly therefrom.

The converging relationship of the cam slots 51 relative to the adjacent portions 47 of the guide slots 45 cause the pivot pins 37 of the adjacent conveyor reaches to gradually move toward each other and thereby elongate the parallelogrammatic link structures progressively with their travel along the guide slot portion 47. This elongation or extension of the conveyor portions connected to the film will, of course, cause a gradual longitudinal stretching of the film concomitantly with its transverse drawing. The simultaneous longitudinal and transverse stretching of the film is preferably at the same draw ratio to insure that uniform characteristics are imparted to all portions of the film. During the stretching of the film 23, the heater 79 maintains the same at an elevated temperature heretofore mentioned.

The tenter clips are released from the film as their movable jaws 73 travel beyond the ends of the cam plates 73, so that the stretched film 23 continues along its generally straight line course toward the take-up means while the tenter clips and their respective endless conveyors 15 commence their arcuate course along the portion 51 of the guide slot 45.

In view of the automatic nature of the apparatus here described, it will be noted that the film 23 is stretched biaxially concomitantly with its advancing movement, with only a minimum supervision being required. In this manner, full assurance is provided that the film 23 will be stretched to the desired degree in all directions and that all portions of the film will have the improved physical characteristics.

It is seen from the above description that the objects of the invention are well fulfilled by the structure described. The description is intended to be illustrative only and it is to be understood that changes and variations may be made without departing from the spirit and scope of the invention as defined by the appended claims.

We claim:

1. Apparatus for stretching a continuous traveling web material including endless conveyors positioned on opposite sides of the path of the web material, each of said endless conveyors formed of a plurality of links pivotally interconnected into an endless lazytong structure, a series of spaced and normally open gripping members carried by each of said endless conveyors, means for moving said conveyors along their respective paths, cam means for operating successive gripping members as they enter a first position to engage the same with longitudinally spaced edge portions of the web material, and means engaging with and gradually compressing the lazytong structures in lateral directions as they are advanced from said first position to a second position so that the spacing between adjacent gripping members of each of said series of gripping members is increased as they move from said first position to said second position, said endless conveyors being disposed along divergent paths so as to cause opposing gripping members to move laterally away from each other concomitantly as the spacing between adjacent gripping members is increased.

2. Apparatus for biaxially stretching a continuous traveling web material including endless conveyors positioned on opposite sides of the path of the web material, each of said endless conveyors formed of plurality of links pivotally interconnected at their ends to provide a lazytong structure, means for imparting movement to said endless conveyors, a series of spaced normally open gripping members carried by each of said endless conveyors, a support plate for each of said conveyors, means on said support plates for guiding its respective endless conveyor along a desired path, means for operating successive gripping members as they enter a first position to engage the same with longitudinally spaced edge portions of the web material, and cam means formed on each of said support plates and engaging with said endless conveyors for gradually extending the same and increasing the spacing between the adjacent gripping members of each series as they travel between said first position and a second position, said endless conveyors being disposed along divergent paths so that opposing gripping members move laterally away from each other concomitantly as the spacing between adjacent gripping members is increased.

3. Apparatus for biaxially stretching a continuous traveling web material including endless conveyors positioned on opposite sides of the path of the web material, each of said endless conveyors including a plurality of links pivotally connected at their end portions by pins into a parallelogrammatic arrangement and providing an endless lazytong structure, means for imparting movement to each of said endless conveyors, a series of spaced normally open gripping members carried by each of said endless conveyors, a support plate for each of said conveyors, an endless slot formed in each of said support plates, each of said slots receiving certain of the endless conveyor pivot pins for guiding the conveyors along desired paths as they are advanced, cam means for operating successive gripping members as they enter a first position to engage the same with longitudinally spaced edge portions of the web material, and a cam slot formed in each of said support plates, each of said cam slots receiving certain of the endless conveyor pins and being disposed in converging relationship with adjacent portions of said guide slots whereby said lazytong structures are gradually extended and the spacing between adjacent gripping members of each of said series of gripping members is gradually increased as they travel between said first position and a second position, said endless conveyors being disposed along divergent paths so that opposing gripping members move laterally away from each other concomitantly as the spacing between adjacent gripping members is increased.

4. Apparatus as defined in claim 3 further including means for heating the web material during its stretching.

5. Apparatus for biaxially stretching a continuous web material including a pair of laterally spaced endless conveyors positioned on opposite sides of the path of the web material, each of said endless conveyors including a plurality of links pivotally connected to each other by pins into an endless series of interconnected link parallelograms, a support plate for each of said conveyors, an endless channel formed in each of said support plates, the pivot pins interconnecting the adjacent link parallelograms of said conveyors disposed in said channels for guiding the conveyors along endless paths as said conveyors are advanced, a series of spaced gripping members carried by each of said endless conveyors, means for maintaining said gripping members engaged with the opposite longitudinal edges of the web material as those portions of the conveyors nearest the web path travel between a first position and a second position, a cam track disposed in converging relationship with those portions of the endless channels nearest the web path, said cam tracks engaging with certain of said pivot pins and serving to urge the same laterally toward the path of the web material as the endless conveyors are advanced between said first and second positions whereby the link parallelograms are gradually extended in a longitudinal direction and the spacing between the adjacent gripping members is gradually increased, said endless conveyors being disposed along divergent paths so that opposing gripping members move laterally away from each other concomitantly as the spacing between the gripping members is increased.

References Cited in the file of this patent
UNITED STATES PATENTS

| | | |
|---|---|---|
| 2,618,012 | Milne | Nov. 18, 1952 |
| 2,755,533 | Miller | July 24, 1956 |
| 2,778,057 | Clark | Jan. 22, 1957 |